United States Patent
Kotari U et al.

(10) Patent No.: US 9,667,480 B2
(45) Date of Patent: May 30, 2017

(54) CONSOLIDATED INFORMATION DELIVERY IN A FIBRE CHANNEL FABRIC

(71) Applicant: Cisco Technology, Inc., San Jose, CA (US)

(72) Inventors: Kishan Kumar Kotari U, Bangalore (IN); Prabesh Babu Nanjundaiah, Bangalore (IN); Chandrashekar Chikkalingaiah Manchanapuara, Bangalore (IN); Vijayalakshmi Matada Chidanandaiah, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 148 days.

(21) Appl. No.: 14/482,038

(22) Filed: Sep. 10, 2014

(65) Prior Publication Data
US 2016/0072734 A1    Mar. 10, 2016

(51) Int. Cl.
*H04L 12/24* (2006.01)
*H04L 29/12* (2006.01)

(52) U.S. Cl.
CPC ...... *H04L 41/0803* (2013.01); *H04L 41/0853* (2013.01); *H04L 61/2038* (2013.01); *H04L 61/6004* (2013.01); *H04L 61/6045* (2013.01)

(58) Field of Classification Search
CPC  H04L 49/357; H04L 41/0893; H04L 61/3015
See application file for complete search history.

(56) References Cited

U.S. PATENT DOCUMENTS

| | | | |
|---|---|---|---|
| 5,664,185 A | 9/1997 | Landfield et al. | |
| 5,926,619 A | 7/1999 | Badovinatz et al. | |
| 7,272,636 B2 | 9/2007 | Pabla | |
| 7,876,707 B2 | 1/2011 | Sasso et al. | |
| 8,621,086 B2 | 12/2013 | Purzynski | |
| 8,811,227 B2 | 8/2014 | Sasso et al. | |
| 2003/0218986 A1* | 11/2003 | DeSanti | H04Q 11/0005 370/250 |
| 2004/0013092 A1* | 1/2004 | Betker | H04L 49/10 370/254 |
| 2007/0266132 A1* | 11/2007 | Hariharan | H04L 29/12254 709/223 |
| 2009/0067430 A1* | 3/2009 | Sasso | H04L 49/65 370/394 |
| 2009/0219827 A1* | 9/2009 | Chen | H04L 49/357 370/252 |
| 2011/0090804 A1* | 4/2011 | Wusirika | H04L 41/0806 370/252 |
| 2013/0010638 A1* | 1/2013 | Sasso | H04L 49/357 370/254 |
| 2013/0208625 A1* | 8/2013 | Sasso | H04L 49/357 370/255 |

* cited by examiner

*Primary Examiner* — Redentor Pasia
(74) *Attorney, Agent, or Firm* — Edell, Shapiro & Finnan, LLC

(57) ABSTRACT

Presented herein are techniques for collecting and delivering consolidated nameserver information in a merged Fiber (Fiber) Channel (FC) fabric. A principal switch in a merged FC fabric collects information from one or more subordinate switches. The principal switch consolidates the information collected from the subordinate switches to generate consolidated nameserver information. The principal switch then pushes the consolidated nameserver information from the principal switch to each of the subordinate switches.

20 Claims, 4 Drawing Sheets

CONSOLIDATED INFORMATION DELIVERY IN A FIBRE CHANNEL FABRIC

TECHNICAL FIELD

The present disclosure relates to the merging of Fibre (Fiber) Channel fabrics.

BACKGROUND

The Fibre (Fiber) Channel (FC) standard addresses the general need in networking for fast transfers of large amounts of information. FC networks utilize an arrangement of switches, referred to as an FC fabric, to connect various computing devices (e.g., storage arrays, servers, etc.). This approach simplifies the overhead associated with network traffic, since computing devices with FC ports only manage a point to-point connection between those FC ports and the FC fabric.

It is often desirable to merge two FC fabrics to, for example, expand a network or link network devices. When merging, the FC fabrics again go through a build process where a principal switch is selected. The principal switch may be configured to, for example, assign one or more unique domain identifiers (IDs) to each of the FC switches in the merged FC fabric.

DESCRIPTION OF EXAMPLE EMBODIMENTS

Overview

Presented herein are techniques for collecting and delivering consolidated nameserver information in a merged Fibre (Fiber) Channel (FC) fabric. A principal switch in a merged FC fabric collects information from one or more subordinate switches. The principal switch consolidates the information collected from the subordinate switches to generate consolidated nameserver information. The principal switch then pushes the consolidated nameserver information from the principal switch to each of the subordinate switches.

Example Embodiments

Figure 1:
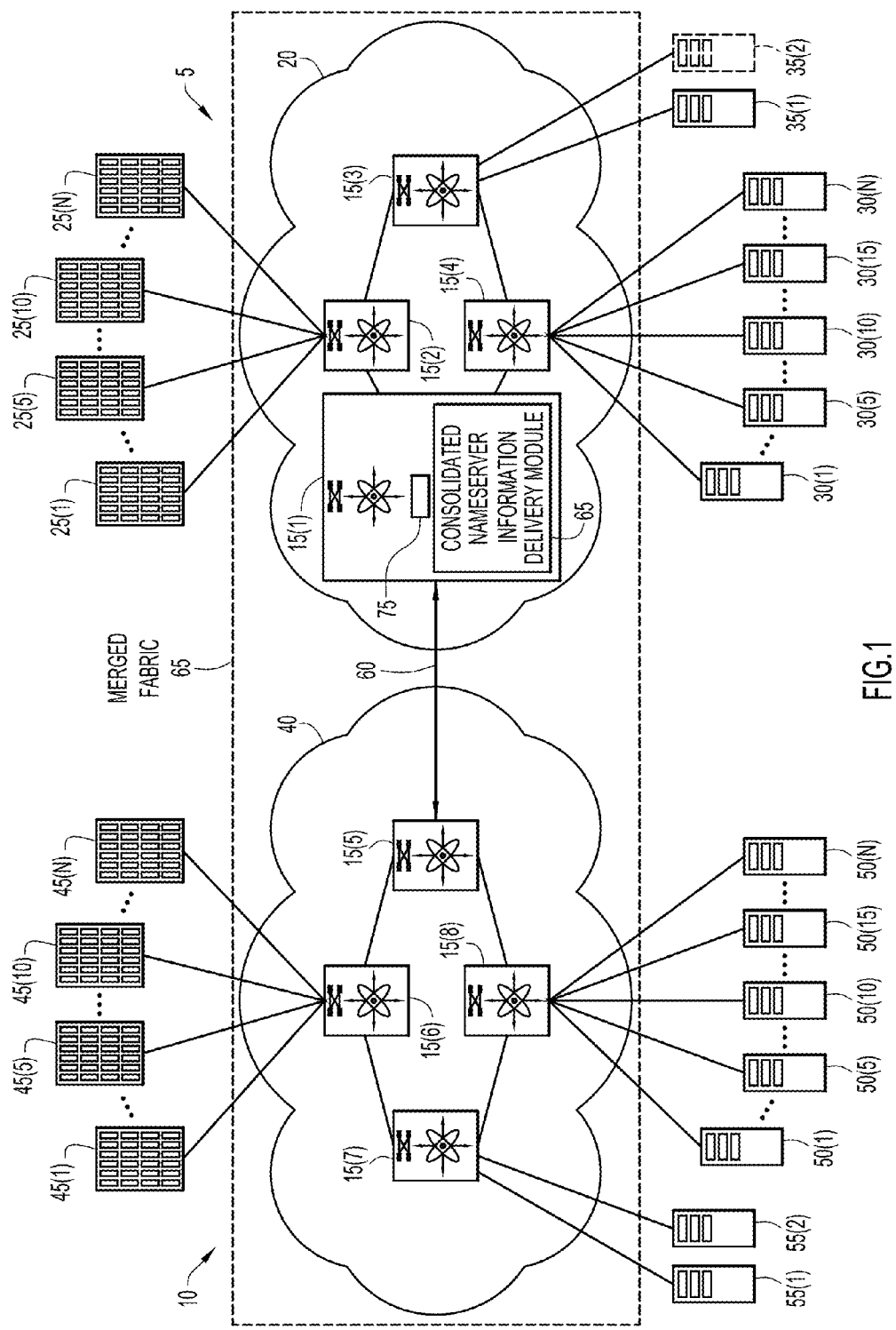
FIG. 1 is a block diagram illustrating the merger of two FC fabrics using consolidated nameserver information delivery techniques in accordance with example embodiments.

FIG. 1 illustrates an example in which a first FC network 5 and a second FC network 10 are merged using consolidated nameserver information delivery techniques in accordance with examples presented herein. In this example, network 5 includes an FC fabric 20 that comprises an arrangement of interconnected FC switches 15(1)-15(4) and network connections between the switches and other elements. Each switch 15(1)-15(4) connects to other switches, and some edge switches may also connect to one or more computing devices. In this example, a number of storage arrays 25(1)-25(N) are connected to switch 15(2), a number of host servers 30(1)-30(N) are connected to switch 15(4), a server 35(1) is connected to switch 15(3), and no computing devices are connected to switch 15(1).

FC network 10 has a configuration that is similar to the configuration of FC network 5. More specifically, network 10 also includes an FC fabric 40 comprising an arrangement of interconnected FC switches 15(5)-15(8) and network connections between the switches and other elements. Each switch 15(5)-15(8) connects to other switches, and some edge switches also connect to one or more computing devices. For example, switch 15(8) connects to servers 50(1)-50(N), switch 15(6) connects to a plurality of storage arrays 45(1)-45(N), switch 15(7) connects to servers 55(1) and 55(2), and no computing devices are connected to switch 15(5).

It is to be appreciated that the specific arrangement shown in FIG. 1 is merely one example of an arrangement in which the consolidated nameserver information delivery techniques may be executed. Accordingly, it is to be appreciated that the consolidated nameserver information delivery techniques may be implemented in other arrangements that include, for example, different numbers of FC switches, computing devices, etc.

FC fabrics 20 and 40 may be located within the same site (e.g., in a common building or campus) or at different remote sites. In any case, a link 60 between switch 15(1) and switch 15(5) may be established to connect the fabrics 20 and 40. The link 60 allows the fabrics 20 and 40 to be merged and may include any suitable combination of components. After creation of link 60, FC fabrics 20 and 40 are collectively referred to as a merged FC fabric 65.

To eliminate ambiguity when routing traffic in an FC fabric, each FC switch is assigned one or more unique domain identifiers (IDs). In general, a domain ID is an eight (8)-bit identifier that forms part of a twenty-four (24)-bit FC address for the respective FC switch. When two FC fabrics merge, the FC fabrics allocate new domain IDs to each FC switch. In other words, the domain IDs that existed in the original two separate FC fabrics are no longer valid and the switches receive new domain IDs for use in the new (merged) fabric. In accordance with examples presented herein, a fabric merge can occur between two or more switches (e.g., a fabric merge occurs, for example, when two fabrics containing multiple switches are connected together, when a single switch is connected to an existing fabric with multiple switches, or when two standalone switches are connected together).

Generally, the FC fabric bring-up/merge protocol starts with the exchange of one or more Exchange Fabric Parameters (EFP) frames that are used by the merging networks to determine whether the merging networks are two stable fabrics, unstable fabrics, or a combination of stable and unstable fabrics. Depending upon the determined stability of the fabrics, the protocol starts with either a build fabric phase followed by a principal switch selection phase, or in the case of two stable fabrics, begins directly with the principal switch selection phase. In either case, after selection of the principal switch, a domain ID distribution phase is executed to allocate each switch in the fabric with a new unique domain ID. In the domain ID distribution phase, the principal switch assigns domain IDs to all switches (including itself) and distributes the domain IDs through the network.

Computing devices attached to the FC switches are referred to as "nodes." A node may have one or more physical interfaces, each referred to as a "node port" or "N_Port." The identities of the nodes are maintained through a hierarchy of assigned names and address identifiers. For example, each node has a fixed eight (8)-byte node name assigned by the manufacturer. If the manufacturer has registered with the Institute of Electrical and Electronics Engineers (IEEE) for a range of addresses, the node name will be globally unique and is referred to as a World-Wide Name (WWN). An N_Port is also assigned a unique 8-byte port name that typically follows the IEEE format. Certain standards allow for the use of sixty-four (64)-bit formats for Internet Protocol (IP) and locally administered names as well as different IEEE formats.

In operation, the WWN or other administered name is not used for transporting frames/packets across the network. Instead, nodes are dynamically assigned a twenty-four (24)-bit fabric or port address, referred to as the N_Port ID, that is used for routing frames within the FC fabric. The 24-bit addresses of two communicating nodes are embedded in the frame header for both the destination identifier (D_ID) and source identifier (S_ID).

The separation of the node name information (e.g., WWN) and the network address information (e.g., N_Port ID) has several benefits. In particular, the use of a shorter 24-bit port address, rather than the 64-bit unique name, optimizes the frame header and routing logic for high-speed switching of frames. In addition, the use of the 24-bit port address allows the topology itself to assign addresses, thereby eliminating manual administration of addresses. Accordingly, each FC switch maintains a logical database that correlates a node's network address information (e.g., the 24-bit port address) to the associated node name information (e.g., 64-bit WWN). In operation, these databases, sometimes referred to as the "name server databases" or simple "name servers," are used by an FC switch to determine a node's network address based on the node name, or to determine the node name based on the node's network address (i.e., convert between address information and name information). Table 1, below, identifies example information that may be maintained within a name server database of an FC switch.

TABLE 1

| Name | Brief Description |
| --- | --- |
| Port WWN | An assigned 64-bit unique identifier (ID) assigned embedded in each port of the node. |
| Node WWN | An assigned 64-bit unique ID embedded in each node. |
| Fibre Channel ID (FCID) | Address received by the node after logging to the FC fabric. |
| Port Type | The type of port(s) on the node (e.g., N-Port or NL-Port). |
| Fibre Channel 4 (FC4) Type | The upper level protocol supported above the FC protocol stack (e.g., scsi-fcp). |
| FC4 Feature | Information of the node related to its upper level protocol support. If fc4-type is scsi-fcp, fc4-feature will be initiator, target, or both. |
| Symbolic Port Name | Alias name for the each port of the node. |
| Symbolic Node Name | Alias name for the node. |
| Fabric Port WWN | The WWN of the switch port through which the node is connected to the FC fabric. |
| Port IP Address(es) | The IP address(es) of the node's port(s). |
| Node IP Address(es) | The IP address(es) of the node. |

Each FC switch within an FC fabric needs a completed name server database that includes, for example, the name and address information (collectively referred to herein as "name server information") for each node attached to the FC fabric (i.e., information is collected for each local and remote node in the FC fabric). As such, in conventional arrangements the FC switches in an FC fabric perform a distributed/de-centralized name server process to populate the name server databases of each FC switch. More specifically, in the distributed name server process each FC switch operates independently (i.e., in a distributed and independent manner) to exchange messages with every other switch in the FC fabric to collect the name and address information. For example, referring to FIG. 1, during a conventional merge process, a principal switch is selected and domain IDs are provided to each of the switches 15(1)-15(8). Each of the switches 15(1)-15(8) then executes a get entries based on port type (GE_PT) exchange where a GE_PT request is sent to every other switch. The GE_PT request is a request for the receiving switch to provide name and address information for each node connected locally thereto (i.e., the computing devices connected locally to the receiving switch). Each switch that receives a GE_PT request from another switch issues a GE_PT response that includes the name server information for the local nodes.

Every FC switch in the fabric performs the GE_PT exchange, thereby achieving a completed name server database. In other words, through a plurality of GE_PT exchanges, each FC switch can complete the name server database stored therein. This means that if there are "n" FC switches (domains) in the FC fabric, there will be (n−1) requests issued by each of the n switches. As such, this results in n*(n−1)*2 messages exchanged within the FC fabric (i.e., n*(n−1) GE_PT requests and n*(n−1) GE_PT responses). The large number of GE_PT messages (requests and responses) may cause network congestion, particularly when large Fabrics merge. The large number of name server frames also extend the time period it takes to merge FC fabrics and is one of the factors that makes it difficult to increase the number of switches in FC fabrics. These problems are magnified as the number of switches in the fabric increases.

As such, presented herein are techniques to merge FC fabrics without the need for distributed name server exchanges between all of the FC switches. Instead, a single switch collects and consolidates the name server information and pushes consolidated/complete name server information to each of the other switches in the FC fabric.

Referring again to the example of FIG. 1, as the FC fabrics 20 and 40 merge, switch 15(1) is selected as the principal switch for the merged fabric. The other switches 15(2)-15(8) are sometimes referred to herein as subordinate switches. As shown, principal switch 15(1) comprises a consolidated nameserver information delivery module 70 configured to implement the techniques presented herein. In particular, the consolidated nameserver information delivery module 70 of principal switch 15(1) collects the name server information for all of the subordinate switches 15(2)-15(8) in the merged fabric 65. The principal switch 15(1) consolidates the name server information received from the subordinate switches 15(2)-15(8) with the local name server information (i.e., the name server information for any computing devices attached locally to switch 15(1)) to generate a complete/full consolidated name server database 75 of consolidated name server information. Once the consolidated name server database 75 of consolidated name server information is generated (i.e., completed to include the name server information for computing devices attached locally to principal switch 15(1) and the computing devices attached locally to each of the subordinate switches 15(2)-15(8)), the principal switch 15(1) pushes the consolidated name server information to each of the subordinate switches 15(2)-15(8). As described further below, the subordinate switches 15(2)-15(8) are prevented/prohibited from requesting name server information until after receipt of the consolidated name server information.

Figure 2:
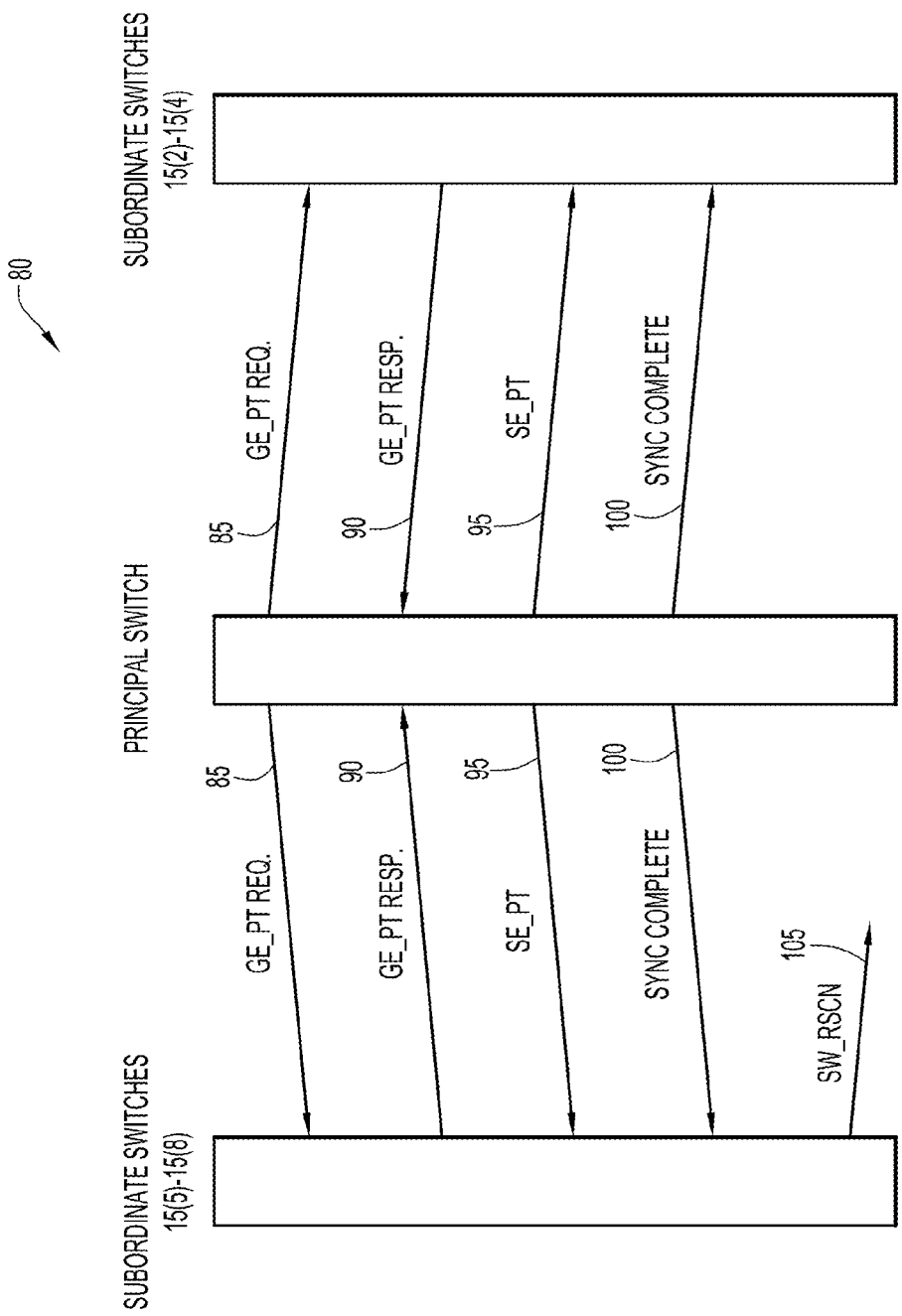
FIG. 2 is a ladder diagram illustrating a consolidated nameserver information delivery technique in accordance with example embodiments.

FIG. 2 is a ladder diagram 80 illustrating consolidated nameserver information delivery techniques in accordance with examples presented herein. For ease of illustration, the ladder diagram 80 is described with reference to consolidation and delivery of name server information to the arrangement of FIG. 1.

As noted above, when fabrics 20 and 40 of FIG. 1 form merged fabric 65, switch 15(1) is selected as the principal switch and has the responsibility of consolidating and delivering the name server information to the other switches 15(2)-15(8). The principal switch is selected for consolidating and delivering the name server information because a principal switch is always available within an FC fabric (i.e., an FC fabric cannot exist without a selected principal switch). Additionally, if a current principle switch goes offline, another switch is selected as the principal switch so that operation of the FC fabric can continue.

In general, the principal switch 15(1) individually communicates with each of the subordinate switches 15(2)-15(8) to request the name server information of the other switches. For example, as shown by reference numerals 85, the principal switch 15(1) sends GE_PT requests to each of the subordinate switches 15(2)-15(8).

Upon receiving the name server information requests (e.g., GE_PT requests), each of subordinate switches 15(2)-15(8) send name server information responses back to the principal switch 15(1). For example, as shown at reference numeral 90, the subordinate switches 15(2)-15(8) each send a GE_PT response to the principal switch 15(1). The GE_PT responses include the name server information for only the nodes locally connected to the respective switch. For example, the GE_PT response sent by switch 15(3) includes only the name server information for server 35(1), the GE_PT response sent by switch 15(7) includes only the name server information for servers 55(1) and 55(2), and so on.

After receiving the name server information responses, the principal switch 15(1) consolidates the name server information received from the subordinate switches 15(2)-15(8) with the local name server information (i.e., the name server information for any local computing devices attached to switch 15(1)) to generate a complete/full consolidated name server database 75 (FIG. 1) of consolidated name server information. As shown at reference numeral 95, the principal switch 15(1) then pushes the consolidated name server information (i.e., name server information for all of the nodes in the merged FC fabric 65) to each of the subordinate switches 15(2)-15(8).

The consolidated name server information is referred to as being "pushed" to the subordinate switches 15(2)-15(8) because the consolidated name server information is sent to the subordinate switches 15(2)-15(8) unsolicited without first receiving an explicit request. That is, none of the subordinate switches 15(2)-15(8) transmit a request for name server information to the principal switch 15(1) prior to receiving the consolidated name server information.

Conventional FC fabrics lack the ability for a principal switch or other switch to push information to the other switches. Therefore, in accordance with certain examples, a command referred to herein as set entries based on port type (SE_PT) is configured at the principal switch 15(1). The SE-PT command enables the principal switch 15(1) with the ability to push to each of the subordinate switches 15(2)-15(8) one or more frames that include the consolidated name server information. The one or more frames that include the consolidated name server information are sometimes referred to herein as consolidated name server frames or SE_PT frames and are shown in FIG. 2 by arrows 95. As shown at 100, after the consolidated name server frames are sent to the subordinate switches 15(2)-15(8), the principle switch 15(1) sends a synchronization complete message to all of the subordinate switches 15(2)-15(8). The synchronization complete message is a notification indicating that the synchronization of the name server information across all switches is complete. In one specific example, the synchronization complete message is a registered state change notification (RSCN) in which a field of the notification indicates completion of delivery of the consolidated name server information to all switches.

During or after formation of merged FC fabric 65, a node may connect to one of the switches 15(1)-15(8). When this occurs, only the local switch (i.e., the switch connected to the added node) includes the name server information for the added node. However, as noted above, the name server databases within all switches 15(1)-15(8) need to be consistent for proper routing. As such, the name server information for the added node needs to be provided to the other FC switches. That is, an update of the name server databases of all FC switches is needed. The name server information for the added node is provided to other switches via an Inter-Switch Registered State Change Notification (SW_RSCN) as shown at reference numeral 105. More specifically, the local FC switch sends SW_RSCNs to each of the other FC switches. When an SW_RSCN is received by an FC switch, the receiving FC switch queries the switch that transmitted the SW_RSCN for the updated name server information.

For example, during or after formation of merged fabric 65, another server may be connected to switch 15(3). This added server is shown in FIG. 1 using dashed lines and is referred to as server 35(2). Switch 15(3) is the local switch (i.e., connected to the server 35(2)) and thus obtains the name server information from server 35(2). In order to update the name server databases of the other switches, switch 15(3) then sends SW_RSCNs to each of the other switches 15(1), 15(2), and 15(4)-15(8). Upon receipt of an SW_RSCN, each of the other switches 15(1), 15(2), and 15(4)-15(8) transmit a GE_PT request to switch 15(3). Switch 15(3) may then respond to each of the GE_PT requests with a GE_PT response that includes the name server information for server 35(2).

A feature of the consolidated nameserver information delivery techniques presented herein is that the updating of the name server databases does not occur until after delivery of the consolidated name server information. That is, the updating functionality of each of the switches 15(1)-15(8) (e.g., sending SW_RSCNs) is disabled/deactivated until receipt of the synchronization complete message (i.e., the notification from the principal switch 15(1) to all of the subordinate switches 15(2)-15(8) indicating that the consolidated name server information has been delivered to all switches). After receipt of the synchronization complete message, the switches are enabled to send SW_RSCNs as needed.

Figure 3:
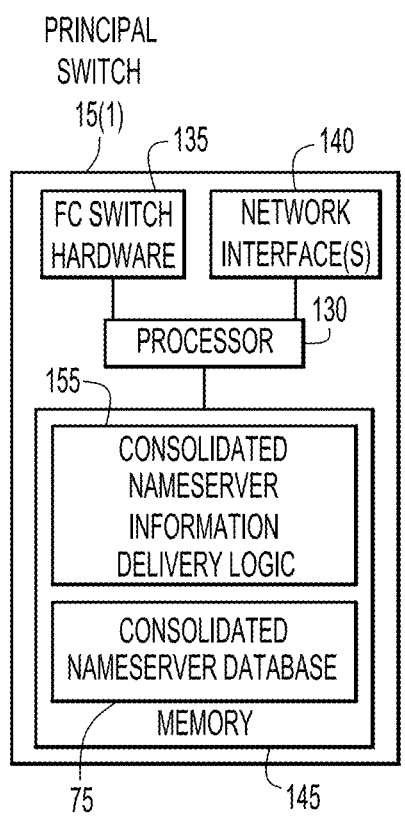
FIG. 3 is a block diagram of a principal switch configured to execute consolidated nameserver information delivery techniques in accordance with example embodiments.

FIG. 3 is a block diagram illustrating one implementation of principal switch 15(1) configured to perform the consolidated nameserver information delivery techniques presented herein. Principal switch 15(1) comprises a processor 130, FC switch hardware 135, network interface(s) 140 and a memory 145. The memory 145 includes a consolidated name server database 75 of consolidated name server information and consolidated nameserver information delivery logic 155. As described above, when completed, the consolidated name server database 75 comprises the consolidated name server information for all of the nodes in the merged FC fabric 65 that is collected by the principal switch 15(1) and subsequently pushed to the subordinate switches 15(2)-15(8).

The collection of the name server information to generate/populate the consolidated name server database and to deliver consolidated name server information to the subordinate switches 15(2)-15(8) is facilitated through the execution of consolidated nameserver information delivery logic 155 in the memory 145. Memory 145 may comprise read only memory (ROM), random access memory (RAM), magnetic disk storage media devices, optical storage media devices, flash memory devices, electrical, optical, or other physical/tangible memory storage devices. Processor 130 is, for example, a microprocessor or microcontroller that executes instructions for the consolidated nameserver information delivery logic 155. Thus, in general, the memory 145 may comprise one or more computer readable storage media (e.g., a memory device) encoded with software comprising computer executable instructions and when the software is executed (by processor 130) it is operable to perform the consolidated nameserver information delivery techniques described herein.

The FC switch hardware 135 comprises digital logic and other circuitry configured to perform the FC switching operations in an FC fabric. The FC switch hardware 135 may be implemented by one or more application specific integrated circuits (ASICs). The network interface(s) 140 include suitable FC interfaces, such as ports, for connection to an FC network and also to any other network for control/command functions associated with switch 15(1).

Figure 4:
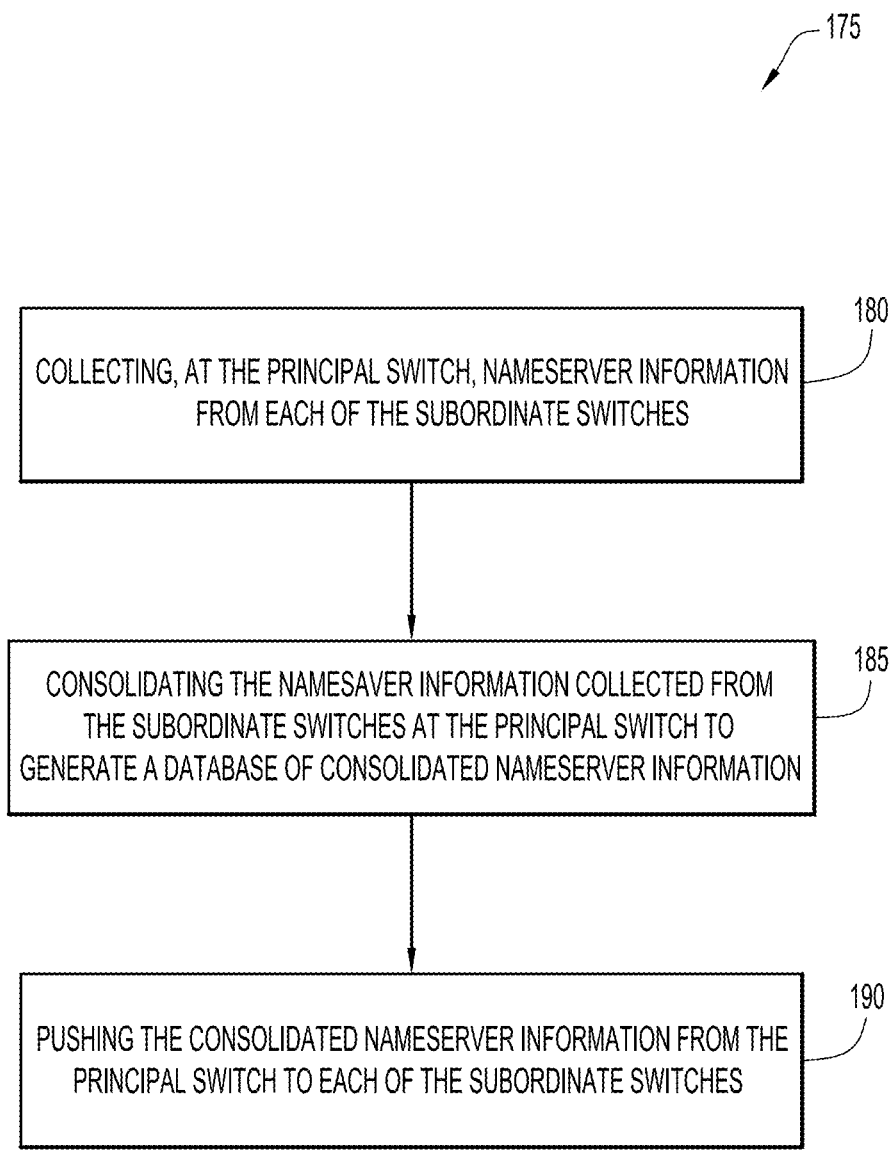
FIG. 4 is a high level flowchart illustrating operations performed during the merger of two FC fabrics in accordance with example embodiments.

FIG. 4 is a high level flowchart illustrating a method 175 performed during the merger of two initially separate FC fabrics to form a merged FC fabric. Method 175 begins at 180 where a principal switch in the merged FC fabric collects information from each of the subordinate switches. At 185, the principal switch consolidates the information collected from the subordinate switches to generate consolidated nameserver information. At 190, the principal switch pushes the consolidated nameserver information from the principal switch to each of the subordinate switches.

Presented herein are information delivery techniques in which, instead of every switch querying every other switch in the FC fabric for information, one switch (e.g., the principal switch) is designated to collect and consolidate all of the information and subsequently deliver the information to the other switches in the FC fabric. The consolidated nameserver information delivery techniques have been primarily described with reference to consolidated delivery of name server information (i.e., populating of the name server databases at the FC switches). It is to be appreciated that the consolidated nameserver information delivery techniques presented herein may be used with other FC services that use a distributed/independent model to synchronize/update information. For example, the techniques presented herein could also be used to update the zone server (zone server databases), management server (management server databases), etc.

The techniques presented herein reduce the number frames that are exchanged during a fabric build process, thereby reducing system load and bandwidth consumption, while achieving consistency of the name server databases and avoiding issues in larger fabric relating to lack of synchronizations. In general, the techniques presented herein enable the size of an FC fabric to scale better than conventional arrangements.

In summary, a method is provided comprising: in a merged Fibre Channel (FC) fabric comprising a principal switch and one or subordinate switches, collecting, at the principal switch, information from each of the subordinate switches; consolidating the information collected from the subordinate switches at the principal switch to generate consolidated nameserver information; and pushing the consolidated nameserver information from the principal switch to each of the subordinate switches.

Similarly, an apparatus is provided comprising: a network interface unit to enable communications over a merged Fibre Channel (FC) fabric; a memory to store consolidated nameserver information for all switches in the merged FC fabric; and a processor coupled to the network interface unit and to the memory, wherein the processor: collects information from each of a plurality of subordinate switches in the merged FC fabric; consolidates the information collected from the subordinate switches to generate the consolidated nameserver information; and pushes the consolidated nameserver information to each of the plurality of subordinate switches.

Further still, one or more computer readable storage media are provided encoded with software comprising computer executable instructions and when the software is executed operable to: in a merged Fibre Channel (FC) fabric comprising a principal switch and one or subordinate switches, collect, at the principal switch, information from each of the subordinate switches; consolidate the information collected from the subordinate switches at the principal switch to generate consolidated nameserver information; and push the consolidated nameserver information from the principal switch to each of the subordinate switches.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    at a principal switch in a merged Fibre Channel (FC) fabric comprising the principal switch and a plurality of subordinate switches;
    collecting, from each of the plurality of subordinate switches, name server information of endpoint devices locally connected to each of the respective plurality of subordinate switches;
    consolidating the name server information collected from the plurality of subordinate switches at the principal switch to generate consolidated name server information;
    pushing the consolidated name server information from the principal switch to each of the plurality of subordinate switches; and
    in response to pushing the consolidated name server information to each of the plurality of subordinate switches, sending a synchronization complete message from the principal switch to each of the plurality of subordinate switches to enable each of the plurality of subordinate switches to update name server databases on each of the other of the plurality of subordinate switches.

2. The method of claim 1, further comprising:
prior to collecting the name server information, assigning, at the principal switch, domain identifiers to the principal switch and each of the plurality of subordinate switches; and
distributing the domain identifiers to each of the plurality of subordinate switches.

3. The method of claim 1, wherein collecting name server information of endpoint devices locally connected to each of the respective subordinate switches comprises:
sending, by the principal switch, a get entries based on port type (GE_PT) request to each of the plurality of subordinate switches; and
receiving a GE_PT response from each of the plurality of subordinate switches that includes the name server information of the endpoint devices locally connected to the respective subordinate switch.

4. The method of claim 1, wherein consolidating the name server information collected from the plurality of subordinate switches at the principal switch to generate the consolidated name server information comprises:
completing a consolidated name server database that includes the name server information of the endpoint devices locally connected to each of the respective subordinate switches and the name server information of the endpoint devices locally connected to the principal switch.

5. The method of claim 1, wherein the synchronization complete message from the principal switch to each of the plurality of subordinate switches is a registered state change notification (RSCN) message comprising a notification field indicating completion of delivery of the consolidated name server information to each of the plurality of subordinate switches.

6. The method of claim 1, further comprising:
initially disabling an ability of the plurality of subordinate switches to send Inter-Switch Registered State Change Notifications (SW_RSCNs); and
in response to receipt of the synchronization complete message, enabling the ability of the plurality of subordinate switches to send SW_RSCNs.

7. The method of claim 1, wherein pushing the consolidated name server information from the principal switch to each of the plurality of subordinate switches comprises:
sending a set entries based on port type (SE-PT) message that includes the consolidated name server information without first receiving a request for information from any of the plurality of subordinate switches.

8. An apparatus comprising:
a network interface unit to enable communications over a merged Fibre Channel (FC) fabric;
a memory to store consolidated name server information for switches in the merged FC fabric; and
a processor coupled to the network interface unit and to the memory, wherein the processor is configured to:
collect, from each of a plurality of subordinate switches in the merged FC fabric, name server information of endpoint devices locally connected to each of the respective plurality of subordinate switches;
consolidate the name server information collected from the plurality of subordinate switches to generate the consolidated name server information; and
push the consolidated name server information to each of the plurality of subordinate switches; and
in response to pushing the consolidated name server information to each of the plurality of subordinate switches, send a synchronization complete message from the principal switch to each of the plurality of subordinate switches to enable each of the plurality of subordinate switches to update name server databases on each of the other of the plurality of subordinate switches.

9. The apparatus of claim 8, wherein the processor is configured to:
prior to collecting the name server information, assign domain identifiers to the principal switch and each of the plurality of subordinate switches; and
distribute the domain identifiers to each of the plurality of subordinate switches.

10. The apparatus of claim 8, wherein to collect name server information of the endpoint devices locally connected to each of the respective plurality of subordinate switches, the processor is configured to:
send a get entries based on port type (GE_PT) request to each of the plurality of subordinate switches; and
receive a GE_PT response from each of the plurality of subordinate switches that includes the name server information for the endpoint devices locally connected to the respective subordinate switch.

11. The apparatus of claim 8, wherein to consolidate the name server information collected from the subordinate switches to generate the consolidated name server information, the processor is configured to:
complete a consolidated name server database that includes the name server information of the endpoint devices that are connected to each of the respective plurality of subordinate switches and the name server information for local endpoint devices directly connected to the apparatus.

12. The apparatus of claim 8, wherein the synchronization complete message from the principal switch to each of the plurality of subordinate switches is a registered state change notification (RSCN) message comprising a notification field indicating completion of delivery of the consolidated name server information to each of the plurality of subordinate switches.

13. The apparatus of claim 8, wherein to push the consolidated name server information to each of the plurality of subordinate switches, the processor is configured to:
send a set entries based on port type (SE-PT) message that includes the consolidated nameserver information without first receiving a request for information from any of the plurality of subordinate switches.

14. One or more non-transitory computer readable storage media encoded with software comprising computer executable instructions and when the software is executed operable to:
at a principal switch in a merged Fibre Channel (FC) fabric comprising the principal switch and a plurality of subordinate switches;
collect, from each of the plurality of subordinate switches, name server information of endpoint devices locally connected to each of the respective plurality of subordinate switches;
consolidate the name server information collected from the plurality of subordinate switches at the principal switch to generate consolidated name server information; and push the consolidated name server information from the principal switch to each of the plurality of subordinate switches; and in response to pushing the consolidated name server information to each of the plurality of subordinate switches, send a synchronization complete message from the principal switch to each of the plurality of subordinate switches to enable each of the plurality of subordinate switches to update name server databases on each of the other of the plurality of subordinate switches.

15. The non-transitory computer readable storage media of claim 14, further comprising instructions operable to:

prior to collecting the name server information, assign, at the principal switch, domain identifiers to the principal switch and each of the plurality of subordinate switches; and distribute the domain identifiers to each of the plurality of subordinate switches.

16. The non-transitory computer readable storage media of claim 15, wherein the instructions operable to collect name server information of the endpoint devices locally connected to each of the respective plurality of subordinate switches comprise instructions operable to:

send, by the principal switch, a get entries based on port type (GE_PT) request to each of the plurality of subordinate switches; and receive a GE_PT response from each of the plurality of subordinate switches that includes the name server information of the endpoint devices locally connected to the respective subordinate switch.

17. The non-transitory computer readable storage media of claim 15, wherein the instructions operable to consolidate the information collected from the plurality of subordinate switches at the principal switch to generate the consolidated name server information comprise instructions operable to:

complete a consolidated name server database that includes the name server information of the endpoint devices locally connected to each of the respective plurality of subordinate switches and the name server information of the endpoint devices locally connected to the principal switch.

18. The non-transitory computer readable storage media of claim 14, wherein the synchronization complete message from the principal switch to each of the plurality of subordinate switches is a registered state change notification (RSCN) message comprising a notification field indicating completion of delivery of the consolidated name server information to each of the plurality of subordinate switches.

19. The non-transitory computer readable storage media of claim 14, further comprising instructions operable to:

initially disable an ability of the plurality of subordinate switches to send Inter-Switch Registered State Change Notifications (SW_RSCNs); and in response to receipt of the synchronization complete message, enable the ability of the principal switch and the plurality of subordinate switches to send SW_RSCNs.

20. The non-transitory computer readable storage media of claim 14, wherein the instructions operable to push the consolidated name server information from the principal switch to each of the plurality of subordinate switches comprise instructions operable to:

send a set entries based on port type (SE-PT) message that includes the consolidated name server information without first receiving a request for information from any of the plurality of subordinate switches.

\* \* \* \* \*